Nov. 10, 1925.
J. H. BURKHOLDER ET AL
1,560,533
VEHICLE JACK
Filed June 23, 1924     3 Sheets-Sheet 1
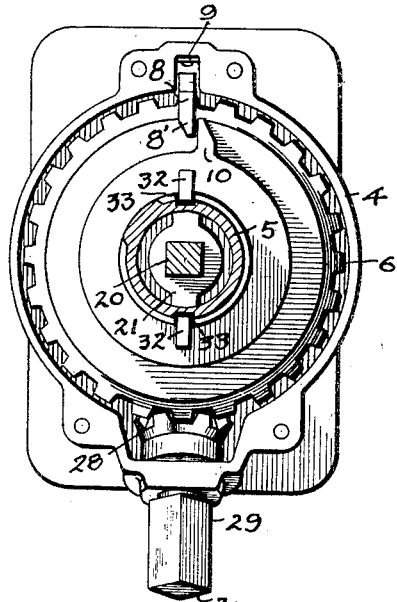
Fig. 3
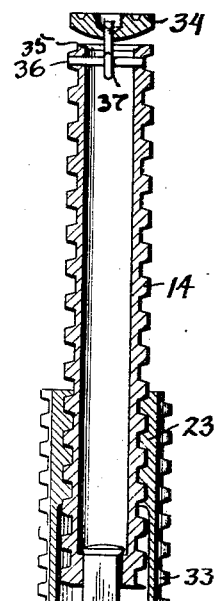
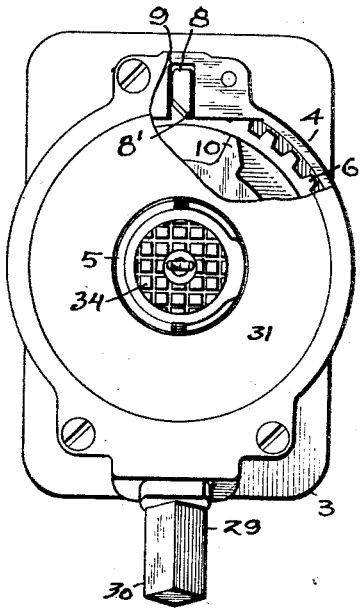
Fig. 2
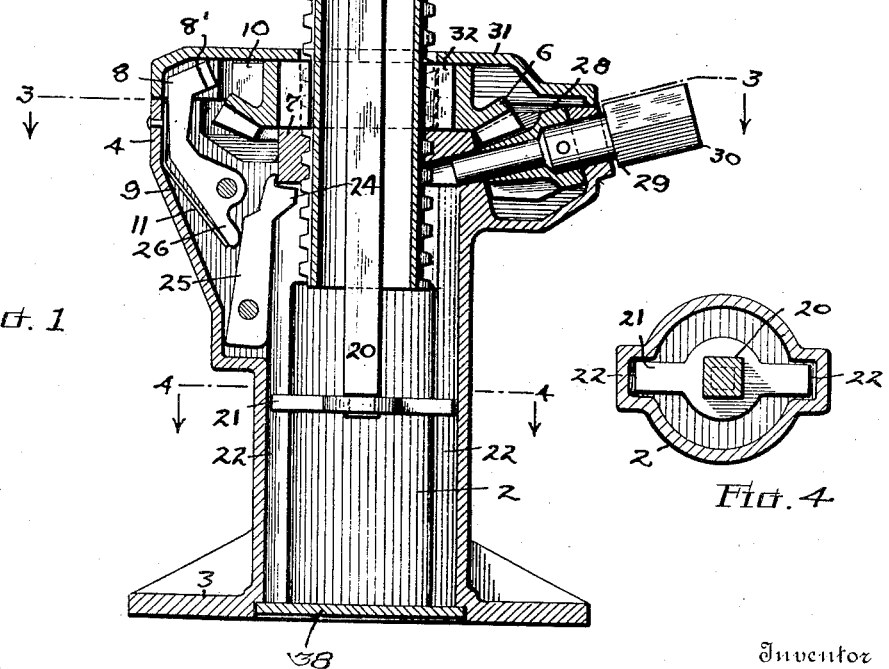
Fig. 1
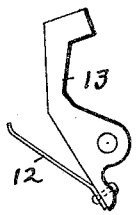
Fig. 5
Fig. 4
Inventor
J. A. CHATER
J. H. BURKHOLDER
By Fisher, *illegible*
Attorney Nov. 10, 1925.                      1,560,533
J. H. BURKHOLDER ET AL
VEHICLE JACK
Filed June 23, 1924        3 Sheets-Sheet 2
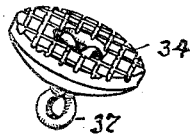
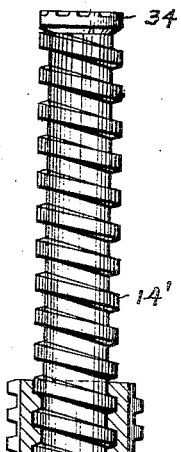
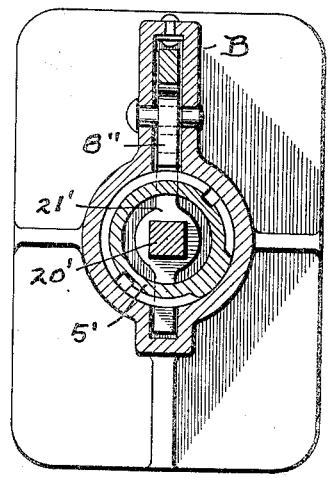
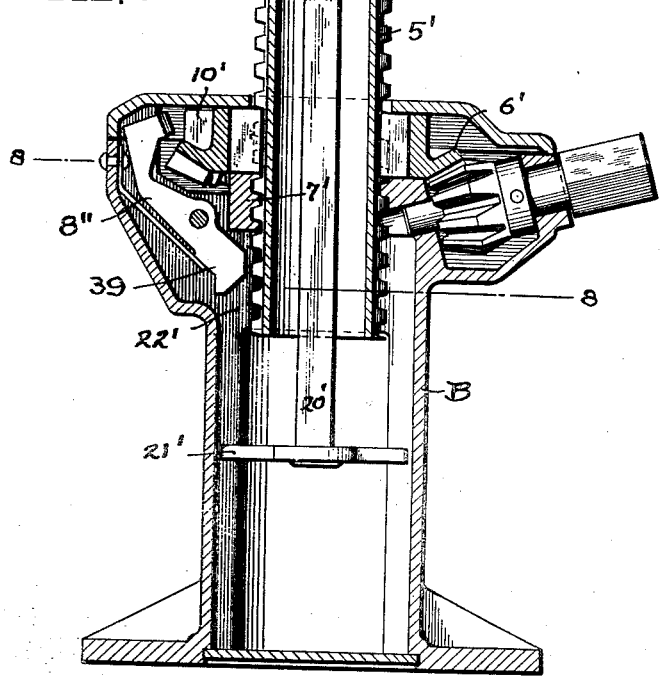
Inventor
J. A. CHATER
J. H. BURKHOLDER Nov. 10, 1925.

J. H. BURKHOLDER ET AL 1,560,533

VEHICLE JACK

Filed June 23, 1924    3 Sheets-Sheet 3

Inventor
J. A. CHATER
J. H. BURKHOLDER

By Fisher Nixen \_\_\_\_
Attorneys

Patented Nov. 10, 1925.

1,560,533

UNITED STATES PATENT OFFICE.

JOHN H. BURKHOLDER AND JOHN A. CHATER, OF ASHLAND, OHIO, ASSIGNORS TO ELITE MANUFACTURING COMPANY, A PARTNERSHIP OR FIRM COMPOSED OF JOHN H. BURKHOLDER, P. E. COUNTRYMAN, AND E. L. KILHEFNER, OF ASHLAND, OHIO.

VEHICLE JACK.

Application filed June 23, 1924. Serial No. 721,786.

*To all whom it may concern:*

Be it known that we, JOHN H. BURKHOLDER and JOHN A. CHATER, citizens of the United States, residing at Ashland, in the county of Ashland and State of Ohio, have invented certain new and useful Improvements in a Vehicle Jack, of which the following is a specification.

Our invention relates to an improvement in vehicle jacks and more particularly in a double screw jack, in which the screws are raised and lowered by bevel gearing, and one general object is to provide automatic means adapted to limit the upward movement of the lift screw by locking one of the gears through which the power is transmitted to the screw, all as hereinafter shown and described and more particularly pointed out in the claims.

In the accompanying drawings, Fig. 1 is a vertical section centrally through a double screw jack embodying our invention, the stop member being shown in an inactive position. Fig. 2 is a top view of the jack, with a portion of the cover plate broken away to disclose a part of the stop mechanism Fig. 3 is a horizontal section on line 3—3 of Fig. 1, but showing the stop member engaged by the stop lug on the gear. Fig. 4 is a horizontal section on line 4—4 of Fig. 1. Fig. 5 is a perspective view of a stop member having a spring attached thereto Fig. 6 is a perspective view of the car member for the upper lift screw. Fig. 7 is a vertical section of a double screw jack showing a modified form of stop mechanism therein. Fig. 8 is a horizontal section on line 8—8 of Fig. 7.

Figure 9:
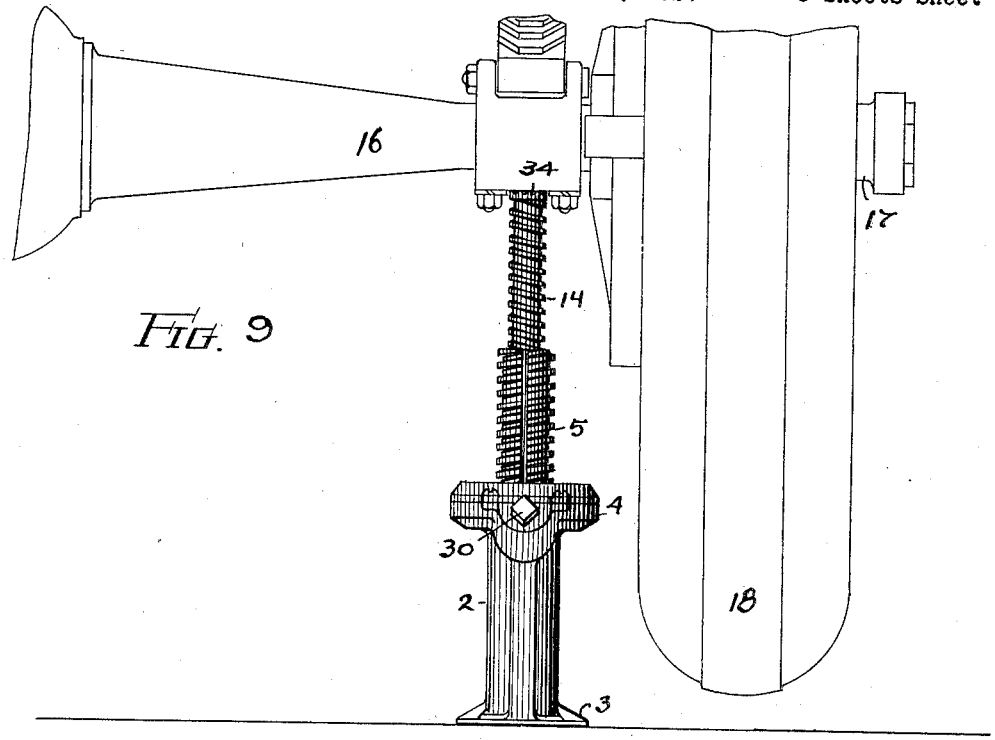
Figure 10:
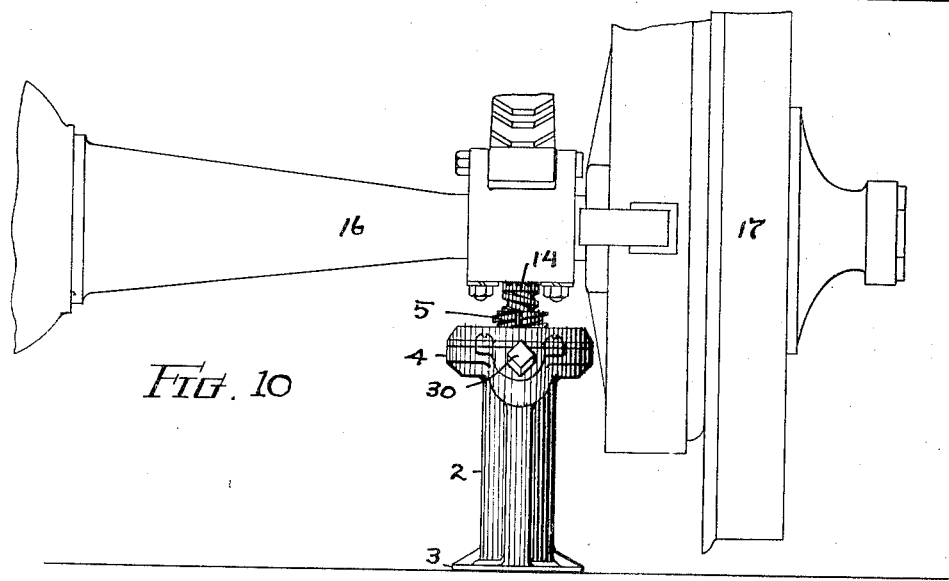

Figs. 9 and 10 are rear views of an improved jack in operating position beneath a vehicle axle, Fig. 9 showing the double screws extended to approximately their highest position, and Fig. 10 showing the screws telescoped and the load in a lower position.

Referring to Fig. 1, the jack exemplified therein comprises a hollow round standard 2 having a flat rectangular base 3 at its bottom and a chambered annular enlargement 4 at its top. A hollow lift screw 5 is adapted to travel upwardly and downwardly within the hollow interior of standard 2 when rotated by a bevel gear 6 which is rotatably seated upon the flat top of a horizontal wall 7 within the upper end of the standard. Hollow screw 5 engages with screw-threads in wall 7 and may be bodily disconnected therefrom if rotated until the bottom of the screw is elevated to the flat top of wall 7. In that case the screw would no longer be supported by the standard and the load and screw would collapse. A definite stop limit for the upward movement of the screw is therefore provided, comprising a beveled pawl or detent 8 which is pivotally mounted within a lateral recess 9 within standard 2 at one side of gear 6 where it may be turned into the path of rotation of a stop lug 10 on top of gear 6. Detent 8 is held normally out of the path of rotation of stop lug 10 by a flat spring 11 which may be secured to the side wall of recess 9 as shown in Fig. 1, or a similar spring 12 may be attached to the modified detent 13 itself as shown in Fig. 5. The function of the spring in either case is to hold the detent inactive and out of stop engagement with lug 10 so that bevel gear 6 may revolve freely during the actual lifting and lowering action of main screw 5 and an auxiliary screw 14 which is telescopically associated in extensible screw connection therewith.

A telescopic screw assembly provides a compact jack of relatively small height which may be readily placed under a low vehicle axle 16 or spring before a tire is placed upon the wheel 17, as illustrated in Fig. 10, and when the two screws are elevated to their limit the load may be raised to a considerable height as illustrated in Fig. 9 wherein a balloon tire 18 is shown in place upon the wheel and lifted above the ground. In that connection it should be understood that the large balloon tires now in general use are mounted upon wheel rims of smaller diameter than commonly employed heretofore, and that the present jack is designed to meet such conditions.

In elevating the screws to their maximum the separation of main screw 5 from standard 2 is prevented by moving detent 8 into a stop position with gear 6 at the proper time, using means connected with inner screw 14. Thus a square rod or bar 20 is telescopically connected with inner screw 14, and this bar has a double-armed cross piece 21 fixed upon its lower end which is held from turning but is free to slide within vertical channels 22—22 at opposite sides of the hollow interior of standard 2. In this way cross piece 21 prevents bar 20 from rotating while the main or outer screw 5 is revolving and operating the inner screw by means of the internal screw-threads 23 at the upper end of main screw 5, and when screw 14 rises to a certain height it will pick up bar 20 and the cross piece 21 will be caused to move upwardly in channels 22 until one arm of the cross piece engages a beveled projection 24 on a pivoted presser bar 25 which engages a depending finger 26 on detent 8. As a result detent 8 is turned on its pivot and its angular extremity 8′ is placed in the path of lug 10 on gear 6, and the application of power to screw 5 is positively checked at gear 6 without undue strain on the parts. One complete revolution of gear 6 in a reverse direction will lower both screws and cross member 21 sufficiently to permit spring 11 to retire detent 8 to an inactive position, and lug 10 and the angular stop extremity 8′ may be beveled to prevent stoppage of the parts in reversal or lowering movements.

The means for operating gear 6 may consist of a bevel pinion 28 fixed to a short stub shaft 29 journaled in the upper walls of standard 2, the squared end 30 of the shaft being exposed at one side of the standard to permit a crank handle or other operating connection to be made therewith. A cover plate 31 is also detachably secured over the chambered top of standard 2, and the lift screws project through a central opening in the same, and this cover plate also holds bevel gear 6 in a fixed rotatable position upon the flat top of cross wall 7. A slidable driving connection between gear 6 and outer screw 5 is provided by a set of keys 32 fixed within gear 6 and projecting into longitudinal grooves 33 at opposite sides of outer screw 5.

A self-centering and leveling rest member 34 having a rounded bottom is loosely seated within a beveled seat 35 at the top of screw 14, and a cross pin 36 extends through an elongated or enlarged eye 37 depending from the center of rest member 34 to connect said member loosely with the screw and to permit it to adjust itself to different angles in setting and operating the jack. A separate closure plate 38 may also be used at the bottom of the central chamber in standard 2.

In Fig. 7 we show a double screw jack B in which the operating parts are identical with the jack hereinbefore described, except that pivoted presser bar 25 is omitted and a modified form of detent 8″ is used instead. This detent has the extremity of its depending part 39 beveled and projected into the vertical channel 22′ where it may be engaged by one arm of a cross piece 21′ carried by bar 20′ which is suspended from and raised and lowered by the inner screw 14′. The upward travel of cross piece 21′ is faster than outer screw 5′ so that when the bottom of screw 5′ reaches the bottom of cross wall 7′ the cross piece 21′ will engage the beveled part 39 of the detent and throw the detent in the path of lug 10′ on gear 6′.

What we claim is,

1. A vehicle jack, comprising a standard, a pair of lift screws mounted upon said standard, a rotatable gear adapted to operate said screws, and a stop for said gear pivoted on said standard having an actuating element operated by one of the screws upon the maximum movement upwardly of both screws.

2. A vehicle jack, comprising a standard, a tubular main screw engaged with said standard having an inner lift screw, a rotatable gear mounted upon said standard and slidably splined to said main screw, a stopping device pivoted upon said standard adapted to engage the teeth of said gear, said device having a depending finger, a pivoted presser bar engaging said finger, and means carried by said lift screw adapted to actuate said presser bar to tilt said device into engaging position with the teeth of said gear upon the maximum upward movement of both screws.

3. A vehicle jack, comprising a standard, a pair of extensible lift screws and rotatable operating means therefor mounted upon said standard, a stopping device upon said standard arranged to intercept said operating means, and means connected with one of said screws and movable vertically adapted to shift said stopping device into an intercepting position with a part of said gear.

4. A vehicle jack, comprising a lift screw, a rotatable gear and a second screw adapted to operate said screw, a stopping device to positively arrest rotation of said gear and second screw, and means connected with said lift screw adapted to shift said stopping device into stop position in elevating both screws to their maximum.

5. A vehicle jack, comprising a pair of telescopic lift screws, a gear adapted to rotate one of said screws, a movable stop to prevent the rotation of said gear, vertically-movable means adapted to prevent the rotation of the other screw during its vertical travel, and a presser element for said stop movable by said means at the end of the upward travel of both screws.

6. A vehicle jack, comprising a standard having a pair of extensible lift screws mounted thereon, a gear adapted to operate said screws, a pivoted detent stationed upon said standard adapted to prevent the rotation of said gear, and means associated with one of said screws adapted to actuate said detent to stop the rotation of said gear when both screws are fully extended.

7. A vehicle jack, comprising a standard, a pair of lift screws in screw connection with each other and said standard, means suspended from one of said screws and slidably engaged with said standard adapted to prevent rotation of said screw, a gear rotatably mounted upon said standard and slidably engaged in driving connection with the other screw, and a stop member stationed upon said standard to positively arrest the rotation of said gear, said stop member being engageable by said suspensory means in elevating both screws to their maximum.

8. A vehicle jack, a standard, a main screw and operating gear therefor mounted upon said standard, said gear having a stop lug thereon, a pivoted spring-pressed detent mounted upon the standard and adapted to be moved into the path of movement of said stop lug, and a second screw having a telescopic attachment adapted to actuate said detent in the last stage of upward travel of both screws.

9. A vehicle jack, comprising a hollow standard having vertical guide-ways therein, a main lift screw having rotatable screw connections with said standard, an extensible screw carried by said main screw having a bar telescopically suspended therefrom, a gear held upon said standard adapted to rotate said main screw, in combination with means mounted upon said standard adapted to engage and stop the rotation of said gear, including a device affixed to said bar adapted to slide in said guideways and prevent said bar and extensible screw from rotating.

In testimony whereof we affix our signatures.

JOHN H. BURKHOLDER.
JOHN A. CHATER.